US009900276B2

(12) United States Patent
Carr et al.

(10) Patent No.: US 9,900,276 B2
(45) Date of Patent: Feb. 20, 2018

(54) SYSTEM AND METHOD FOR LAUNCHING SUBMITTING-USER-DEFINED COMMUNICATIVE ACTION BASED ON IMAGE MATCHING

(71) Applicants: J. Scott Carr, Raleigh, NC (US); Mark Norton, Raleigh, NC (US)

(72) Inventors: J. Scott Carr, Raleigh, NC (US); Mark Norton, Raleigh, NC (US)

(73) Assignee: Red Gun Technologies, Inc., Raleigh, NC (US)

( * ) Notice: Subject to any disclaimer, the term of this patent is extended or adjusted under 35 U.S.C. 154(b) by 201 days.

(21) Appl. No.: 15/131,494

(22) Filed: Apr. 18, 2016

(65) Prior Publication Data

US 2016/0315893 A1 Oct. 27, 2016

Related U.S. Application Data

(60) Provisional application No. 62/151,657, filed on Apr. 23, 2015.

(51) Int. Cl.
*G06F 15/16* (2006.01)
*H04L 12/58* (2006.01)
(Continued)

(52) U.S. Cl.
CPC ............. *H04L 51/10* (2013.01); *G06F 9/542* (2013.01); *G06F 17/3028* (2013.01);
(Continued)

(58) Field of Classification Search
CPC ......... H04L 51/10; H04L 51/38; H04L 67/02; H04L 67/306; G06F 17/30247; G06F 17/3028
See application file for complete search history.

(56) References Cited

U.S. PATENT DOCUMENTS 8,909,618 B1 * 12/2014 Bushman ........... G06Q 30/0601
707/711
2014/0304055 A1 * 10/2014 Faith ................ G06Q 20/40145
705/14.26

(Continued)

*Primary Examiner* — Moustafa M Meky
(74) *Attorney, Agent, or Firm* — Coats & Bennett PLLC

(57) ABSTRACT

A system includes an image repository that maintains a plurality of images submitted by submitting users. Upon submitting an image, the submitting user may specify one or more communicative actions to be launched in the event that a searching user presents the same image to the repository. The presented image is searched against every image in the repository using image matching technology. If a match is found—that is, if the presented image is substantially the same as an image previously submitted and stored in the repository (i.e., the same image or a photograph thereof)—then one or more communicative actions, previously defined by the submitting user and associated with the stored image, are launched towards the searching user. A submitting-user-defined communicative action may include any action that communicates information to the searching user, such as sending the searching user a predefined email or text message, playing a predefined media file, displaying information stored in a profile of the submitting user, etc.

22 Claims, 4 Drawing Sheets

(51) Int. Cl.
*H04L 29/08* (2006.01)
*G06F 17/30* (2006.01)
*G06F 9/54* (2006.01)

(52) U.S. Cl.
CPC ........ *G06F 17/30247* (2013.01); *H04L 51/38* (2013.01); *H04L 67/02* (2013.01); *H04L 67/10* (2013.01); *H04L 67/306* (2013.01)

(56) References Cited

U.S. PATENT DOCUMENTS

| | | | | |
|---|---|---|---|---|
| 2014/0337697 | A1* | 11/2014 | Ryu | G06F 17/2235 715/205 |
| 2015/0088994 | A1* | 3/2015 | Choi | H04L 65/601 709/204 |
| 2016/0093106 | A1* | 3/2016 | Black | G06K 9/00624 345/633 |

* cited by examiner (Performed by web server)

US 9,900,276 B2

SYSTEM AND METHOD FOR LAUNCHING SUBMITTING-USER-DEFINED COMMUNICATIVE ACTION BASED ON IMAGE MATCHING

TECHNICAL FIELD

The present disclosure relates to image recognition, and more particularly to a system and method of using images to index a database, and upon matching an image, launching one or more communicative actions defined by a user who submitted the matching image.

BACKGROUND

Images are a ubiquitous on Internet sites and applications such as social media, ecommerce, and the like. Indeed, images are the raison d'etre of many sites, such as PINTEREST, GOOGLE IMAGES, and the like. With the advent and widespread use of modern cellular telephones, much of the population walks around with a high-resolution, color, digital camera at the ready, resulting in a staggering proliferation of images, many of which are shared to social media and other sites.

While the sheer number of images online continues to explode, the use of images online has not changed much since the earliest days of the World Wide Web. That is, images may be viewed by a user through a browser, or may be statically linked, such as via a markup language, to e.g. a web site, a media file, or the like.

Many ecommerce sites and social media platforms limit communications between users, and/or impose limits on the size of files (images or otherwise) which may be shared. For example, the auction site EBAY hides contact information between sellers and buyers until a sale is complete. EBAY will even disallow the use of images by sellers that have "watermarks," or text information overlaid on the image, such as the seller's email address or other contact information. This prevents the buyer from contacting the seller and arranging a "side deal," avoiding the commission EBAY charges on the sale. Similarly, many dating sites will allow users to browse images and provide limited information about the potential match, but withhold actual identification and contact information until both parties agree to a "match," when the site collects a fee. As another example, FACEBOOK limits the size of media files users can post to their "wall," preventing, e.g., a musical band from posting a digital sound recording.

The use of an image is central to activity on many of these sites which include restrictions on communication. An image is central to fomenting buyer/user interest in the auction and dating site examples. In the FACEBOOK example, a band may wish to link a digital music file to an image of album cover art, to promote the album.

The Background section of this document is provided to place embodiments of the present invention in technological and operational context, to assist those of skill in the art in understanding their scope and utility. Approaches descried in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a system includes an image repository that maintains a plurality of images submitted by users, referred to herein as "submitting users." Upon submitting an image, the submitting user may specify one or more communicative actions to be launched in the event that another user—referred to herein as a "searching user"—presents the same image to the repository. The presented image is searched against every image in the repository using image matching technology. If a match is found—that is, if the presented image is substantially the same as an image previously submitted and stored in the repository (i.e., the same image or a photograph thereof)—then one or more communicative actions, previously defined by the submitting user and associated with the stored image, are launched towards the searching user. A submitting-user-defined communicative action may include any action that communicates information to the searching user, such as sending the searching user a predefined email or text message, playing a predefined media file, displaying information stored in a profile of the submitting user, etc. The system includes numerous social media features, and users may access the system by visiting a web site or via a smartphone/tablet app. The system creates an entire new paradigm of image-based communications, which are not bound by the restrictions imposed by any website or app on which an image may appear.

One embodiment relates to a method of launching communicative actions based on image matching. A first image submitted by a first user is received. One or more communicative actions to be launched if the image, or a photographic depiction of the image, is submitted by a second user, are received from the first user. The image and the communicative actions defined by the first user are registered in the image repository. a second image presented by a second user is received. It is determined whether the second image is substantially the same as the first image, or is a photographic depiction of the first image. If the second image is not substantially the same as the first image, and is not a photographic depiction of the first image, a notification is transmitted to the second user that the second image does not match any image in the image repository. If the second image is substantially the same as the first image, or is a photographic depiction of the first image, the communicative actions defined by the first user and registered for the first image are launched.

Another embodiment relates to a web server. The web server includes a communication interface, at least one database, and a processor operatively connected to the communication interface and the database. The processor operative to receive a first image submitted by a first user; receive one or more communicative actions from the first user to be executed if the image, or a photographic depiction of the image, is submitted by a different second user; register the image and the communicative actions defined by the first user in the image repository; receive a second image presented by a second user; determine whether the second image is substantially the same as the first image, or is a photographic depiction of the first image; if the second image is not substantially the same as the first image, and is not a photographic depiction of the first image, transmit a notification to the second user that the second image does not match any image in the image repository; and if the second image is the same as the first image, or is a photographic depiction of the first image, launching the communicative actions defined by the first user and registered for the first image.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

For convenience, similar reference numerals are used throughout the Figures to indicate similar elements.

DETAILED DESCRIPTION

System Overview

Figure 1:
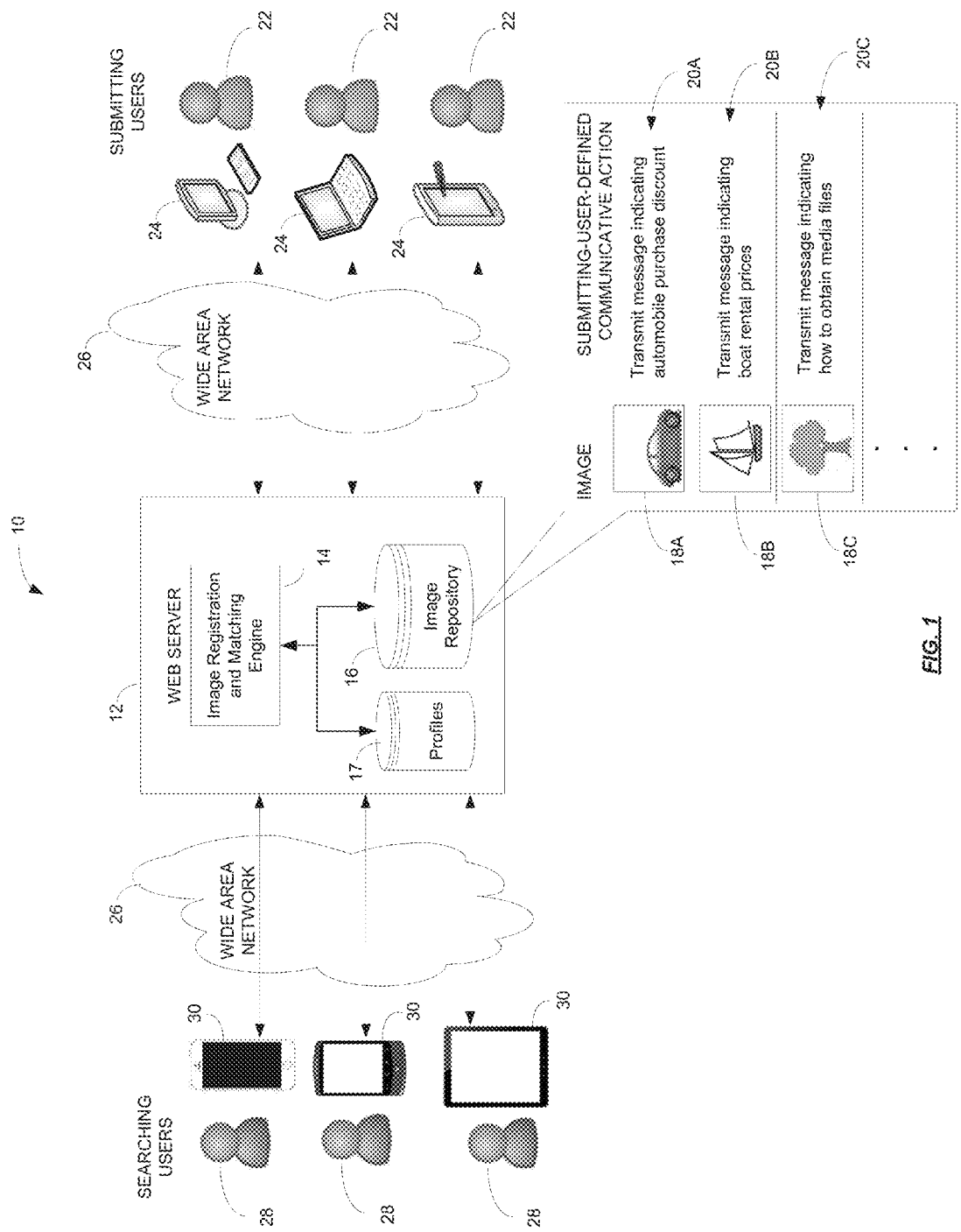
FIG. 1 schematically illustrates a system for launching submitting-user-defined communicative actions based on image matching.

FIG. 1 schematically illustrates a system 10 for launching submitting-user-defined communicative actions based on image matching. The system 10 includes a web server 12 that registers images from submitting users (submitted via computing devices 24), and determines whether candidate images presented by searching users 28 (via searching user computing devices 30) are the same as, or are photographic depictions of registered images. If a match is found for a registered image in an image repository 16, then the submitting-user-defined communicative actions linked to that registered image are executed.

The searching users 28 use searching user computing devices 30 (e.g., smartphones, tablets, or laptops) to communicate with the web server 12 via a wide area network (WAN) 26, such as the Internet. Submitting users 22 use their respective computing devices 24 to communicate with the web server 12 via the same or another WAN 26 (e.g., the Internet). Each of the searching users 30 and submitting users 22 have profiles accessible by the web server 12, stored in a profile repository 17.

The profile for a submitting users 22 may store some identifying information for the submitting users 22 (e.g., name and contact information), as well as an indication of which images that user has registered in the web server 12. The profile for a searching user 28 may store some identifying information for the searching user 28 (e.g., name and contact information) as well as preferences indicating a preferred contact method (e.g., which of Short Message Service "SMS", email, phone, or postal mail are a favored contact method). The submitting users 22 and searching users 28 can access the web server 12 to update their profiles. Also, a submitting user 22 could access the web server 12 to change the communicative actions associated with each of their registered images, to delete registered images, and to register new images.

The webserver includes an image registration/matching engine 14 that can register images from submitting users 22 in image repository 16, and can determine whether an image presented by a searching user 28 matches any images stored in the image repository 16. In this regard, a "match" means that the image from the searching user 28 is the same as the registered image, or is a photographic depiction of the registered image. As shown in FIG. 1, a plurality of images 18 are registered in the image repository 16, each having at least one corresponding communicative action. These example images 18, as well as a number of use cases for the system 10, will now be discussed.

Example Use Cases

Registered image 18A depicts a car, and its corresponding submitting-user-defined communicative action 20A is to transmit a message indicating an automobile purchase price (or other relevant information) to a searching user 28. Assume, for example, that the car depicted is for sale via an online auction website (e.g., EBAY). If searching user 28 uses their respective searching user computing device 30 to either obtain the car image (e.g., from an auction webpage) or take a photograph of the car image (e.g., by taking a photograph of an electronic display depicting the car image, such as via the camera of a cellular telephone or tablet computer), the searching user 28 can present that image as a candidate image to the engine 14, and the engine 14 can determine whether the candidate image matches an image registered in the repository (i.e., is the same as, or is a photographic depiction of, a registered image in the repository 16). If the candidate image matches a registered image, then the submitting-user-defined communicative actions for that registered image are launched, or executed. In the example of image 18A, the submitting-user-defined communicative action 20A may be to transmit a message to the searching user 28 indicating an automobile purchase price. This could be performed using contact information for the searching user 28 that is stored in the searching user's profile in profile repository 17.

Such communications could add a new layer to the shopping experience of an ecommerce website, by effectively augmenting the communications that are possible between buyer and seller within the confines (and restrictions) of the website. Thus, without knowing the contact information for each other, the buyer and seller may still be able to communicate directly with each other, outside of the website (e.g., EBAY). This could also overcome limitations inherent in a given ecommerce platform where messaging features are quite limited. Restrictions relating to, e.g., message length, use of images, use of video, use of attachments, etc. could be avoided.

Registered image 18B depicts a sailboat, and its corresponding submitting-user-defined communicative action 20B may be to transmit a message indicating rental prices for the sailboat to a searching user 28. The sailboat image could be posted on a flyer or on a website, for example. If a searching user 28 submitted the image 18B itself, or a photograph depicting the image 18B, to the web server 12, and a match was detected, the web server 12 could transmit a message to the end user 28 indicating boat rental prices for the boat depicted in the image 18B. In this regard, the transmission of the rental prices could be used to bypass communication limitations of a rental website. Alternatively, it could be used as a way to entice customers to seek more information about the boat before divulging price information.

Registered image 18C depicts a tree. Assume that the image of the tree is an album cover for a musical artist or musical group. The submitting-user-defined communicative action 20C corresponding to the image 18C may be to transmit a message indicating how to obtain media files, such as the songs on the album having the album cover 18C. The transmitted message could provide a hyperlink to songs on the album. Alternatively, the web server 12 could transmit the songs themselves for playback on a device of the searching user (e.g., smartphone, tablet, or computer) instead of sending a hyperlink to the files. This could be used to overcome file sharing limitations of websites, such as social networks. Many websites where media can be shared have file size limits. This includes social networking sites, such as FACEBOOK. Such limitations may prevent the sharing of large files (e.g., an entire album of music). The system 10 could overcome this limitation by sending a message outside of the website at issue, so that the searching user 28 can obtain larger media files (or a single large media file) for a musical artist or musical group.

In all of these examples, which are representative only and not limiting, the element central to enabling the communication is an image. The applications in which image-matching may advantageously launch submitting-user-defined communications are myriad and diverse.

As one example, the system could be very useful for photographers. A problem for photographers is that if their images become popular, those images may be proliferated on the Internet without any attribution or payment. By registering those images in the image repository 16, submitting users 28 could submit those images, or photographic depictions of those images, to the web server 12, and if a match was found could receive a message indicating, for example, how to purchase the image and/or more information about the photographer. This could also provide a useful line of communication for the photographer (who is a submitting user 22 in the system 10) to determine where their images are proliferating.

Another use case for the system 10 concerns dating websites. Such websites often entice users by letting them know that there are potential romantic matches for them, but then making them pay to obtain information about such matches. If users of such a website registered their profile photos in the image repository 16, then they could freely exchange information outside of such websites. For example, if a first person submitted a profile image to a dating website, and the profile image which was found to be favorable by a second person, that second person could present the photo image, or a photographic depiction of the profile image, to the web server 12, and if a match was found could receive contact information for the first person (without paying the dating website).

Another use case is for enticing end users to purchase a piece of media. In one example, the image registered in the repository 16 is the cover of an e-book. If a searching user presents the image, or a photographic depiction of the image, to the web server 12, the web server 12 may transmit a hyperlink to the searching user 28 for downloading a free excerpt of the e-book. The searching user 28 may then be enticed to purchase the entire e-book. The same technique could be applied for music (e.g., register album cover, and send link to free download of one or more songs, or one or more song excerpts, from the album).

Another use case is for notifying searching users 28 of how to purchase an item. On the Internet, product images can proliferate and it can be difficult to find where to purchase items in some instances. On websites such as PINTEREST, for example, images of rooms are often shared, and it may be unclear where to purchase items featured in that room. The system 10 could be used to conveniently provide information on purchasing depicted items. For example, a submitting user 22 may notice that an image depicting of one of their products is becoming very popular on PINTEREST. The submitting user 22 could register the image (or a portion of the image that features their product) in the system 10, so that if the an image presented by a searching user 28 matches the registered image, then instructions could be provided to that searching user 28 regarding how to obtain the depicted product.

Other types of submitting-user-defined communicative actions could be used too. In one embodiment, an instruction associated with an image commands the web server 12 to invoke an Application Programming Interface (API) for software by the submitting user 22. If submitting user 22 is a car dealership who registers images of cars, for example, the API may be part of sales lead-generation software whereby a searching user 28 may be entered by the software into a database of potential customers, which could set into motion a number of other features (e.g., instructing a sales associate to contact the customer, entering the user on a company mailing list, etc.). User information for the searching user 28 could be obtained from the searching user's profile in the profile repository 17.

In some embodiments, the instruction may be to send a hyperlink to a user. This could be used in an advertising context, for example. Advertising on the Internet can be quite costly. This is particularly true on social networking websites. A company could avoid such costs by registering an image (e.g., of a product or service that is offered by the company), in the image repository 16, and posting that image on a social networking website. If a searching user sees the image on the social networking website, that end user could present the image, or a photographic depiction of the image, to the web server 12 to obtain more information about the product or service. In such embodiments, the system 10 could be used to convert any image into an advertisement, without requiring any changes to the image itself.

Thus, the system 10 may be used to take any two dimensional image that may otherwise just be viewed, and to augment that viewing experience by facilitating communication between the viewer (e.g., searching user 28) and another party (e.g., the submitting user 22).

Web Server Operations

Figure 2:
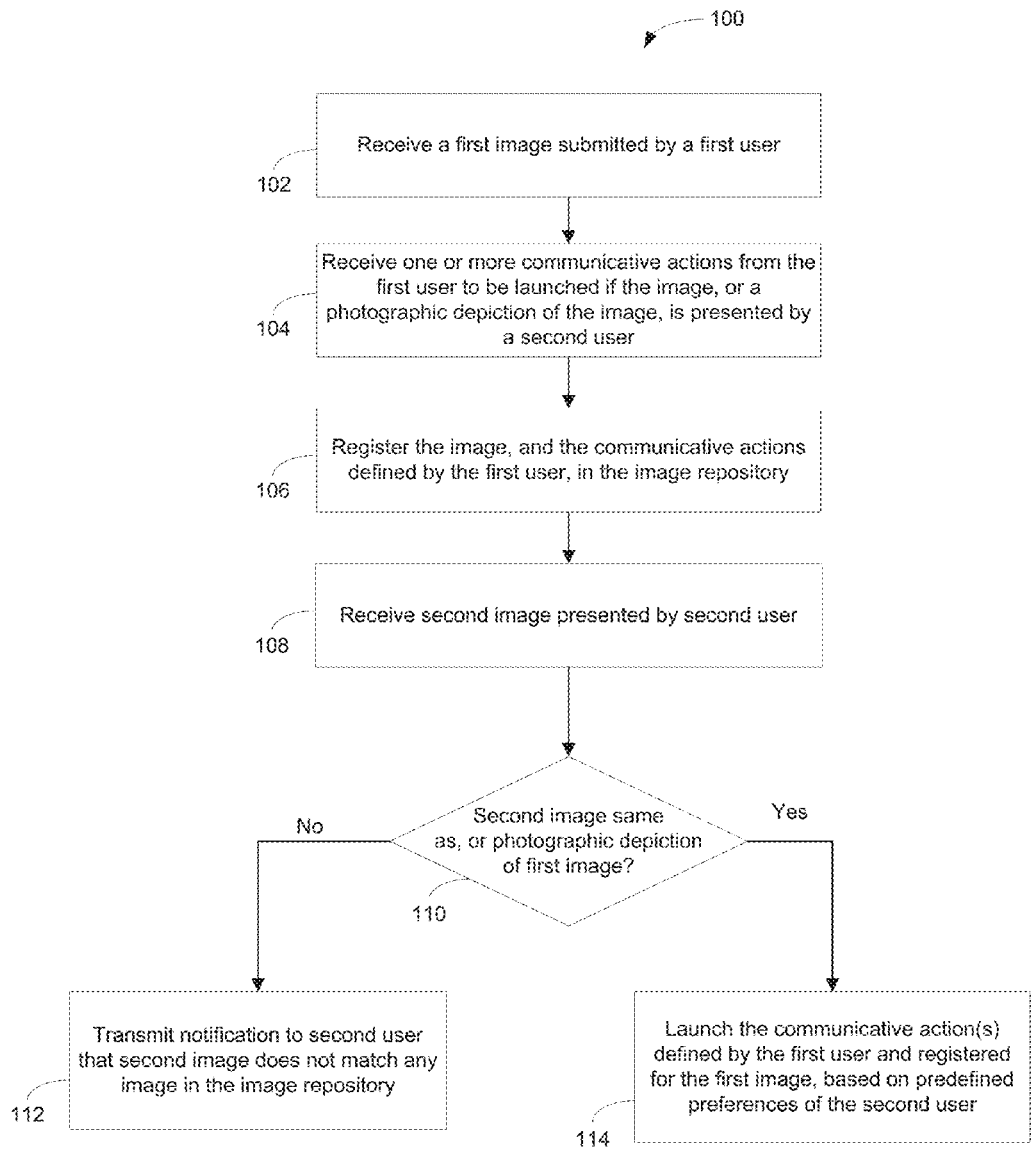
FIG. 2 is a flowchart of an example method for launching submitting-user-defined communicative actions based on image matching.

FIG. 2 illustrates a method 100 performed by the web server 12. A first image is submitted by a first user and received by the web server 12 (block 102). The "first" user in this case may be a submitting user 22. One or more communicative actions are also received from the first user to be launched if the image, or a photographic depiction of the image, is submitted by a different second user (block 104). The "different, second user" may be a searching user 28. The image and the first-user-defined communicative actions are registered in the image repository 16 (block 106).

A second image presented by the second user is then received as a candidate image (block 108). The second image may be submitted via a mobile phone (or tablet) application that is a dedicated application for the system 10, for example (hereinafter "dedicated application"). The web server 12 determines if the second image is the same as the first image, or is a photographic depiction of the first image (block 110). If the second image is not the same as, or a photographic depiction of the first image (a "No" to block 110), then the web server 12 transmits a notification to the second user that the second image does not match any image in the image repository 16 (block 112). However, if the second image is the same as, or a photographic depiction of the first image (a "Yes" to block 110), then the web server 12 launches the communicative actions defined by the first user and registered for the first image (block 114).

To perform the determination of block 110, one or more image matching algorithms could be utilized that are either proprietary or are known to those of ordinary skill in the art. For example, the image matching algorithms used by CAM-FIND, VISCOVERY.CO, or www.tineye.com, could be used. Of course, these are only examples, and it is understood that other image matching algorithms could be used.

In one or more embodiments, to perform the image matching, the image matching algorithm implemented by the engine 14 of the web server 12 uses a fingerprinting technique whereby the engine 14 randomly selects 8-10 image areas having precisely defined pixel boundaries within a candidate image submitted by a searching user, analyzes the pixel data, and then searches within the image repository 16 to determine whether the 8-10 image areas are present in any registered images. In one or more embodiments, the image areas that are analyzed are randomly selected. In one or more embodiments, the web server 12 uses an image matching threshold that is less than 100% to accommodate for variations between the registered image and the candidate image that may result if the candidate image is a photographic depiction of the registered image. For example, there may be lighting variations and/or angle variations if the searching user 28 records the candidate image at different times of day and from different angles and distances. Also, having a matching threshold that is less than 100% could account for a scenario where the registered image is watermarked, and the candidate image is not watermarked (or vice versa). In one or more embodiments, the web server can determine a match based on partial image matching. This could be useful if the candidate image is a cropped version of the registered image, for example.

The launching of submitting-user-defined communicative actions in block 114 could include transmission of a notification to the searching user 28. The notification may include any one of, or any combination of, the following:

sending a SMS message to the searching user 28;

sending an email to the searching user 28;

initiating a phone call to the searching user 28 (or transmitting an electronic notification to a computing device of a person who is to initiate the phone call);

sending postal mail (or via FedEx, UPS, etc.) to the searching user 28 (to initiate the mailing of physical mail, the web server 12 may transmit a notification to another computing device that initiates the mailing or notifies an appropriate party to initiate the mailing);

sending a link to a website or application on the Internet to the searching user 28 (or directly forwarding the searching user 28, via the application used to submit the searching user image to the web server 12, to such a website or application); and/or presenting a video the searching user 28 (to present the video, the web server 12 may send a link to the video, or may directly forward the searching user 28, via the application used to submit the searching user image to the web server 12, to the video).

Thus, in some embodiments, a link could be sent to the searching user 28 as an email or SMS message, and that link may send the searching user to a webpage or executable program. In some embodiments, a video could be started on a mobile phone of the searching user 28. In some embodiments, the dedicated application used by the searching user 28 to present its candidate image (i.e. the "second image" in block 108) to the web server 12 could launch another application on the mobile phone in order to present some media, such as a video (e.g., viewed through a YOUTUBE application on the mobile phone) or an image or sound file. Alternatively, the dedicated application media could be presented within the dedicated application. If a website is presented to the searching user 28, the website may be one where an item or service depicted in a registered image could be purchased.

In some embodiments, when a match is identified, the web server 12 also transmits a notification to the submitting user 22 that registered the image for which a match has been identified. This could enable the submitting user 22 to keep track of how many matches are found for his or her registered images. In some embodiments, the web server 12 would also notify a submitting user 22 if someone tried to register an image that was already registered by the submitting user 22.

The launching of submitting-user-defined communicative instructions in block 114 may be based on predefined preferences of the searching user 28. For example, the searching user 28 may indicate that his or her desired method of receiving notifications is through Short Message Service (SMS) messages. Based on this preference, the web server 12 may transmit its notifications in blocks 112 and/or 114 to such a searching user 28 via SMS.

The launching of submitting-user-defined communicative instructions in block 114 may also be based on a relationship between the searching user 28 and the submitting user 22. Relationship information could be obtained from a social networking website. Social networking sites, such as GOOGLE+, permit users to group their friends into circles, so that varying amounts of information can be shared with those circles. Some example circles could include family, friends, and acquaintances. This can enable sharing of information with some or all of the groups, and can be useful when certain information is deemed to be inappropriate for one or more of those groups.

The web server 12 could leverage those distinctions. Consider the example of a family that goes on vacation and has 100 photos, but many of which are personal in nature and for which the family wishes to only share to close friends/relatives. The family could post one or more of those images on a social networking website, and register the same images in the web server 12. Then, searching users who are friends with the submitting user in the social networking website could submit one of those images to the web server 12. In return, the web server could determine what level of friend they are (e.g., family, friend, or acquaintance), and then provide additional ones of the 100 photos to the searching user depending on the friend level. For example, photos 1-20 may be given to family only, photos 21-40 may be available to friends only, and photos 41-100 could be available to family, friends, or acquaintances.

Figure 3:
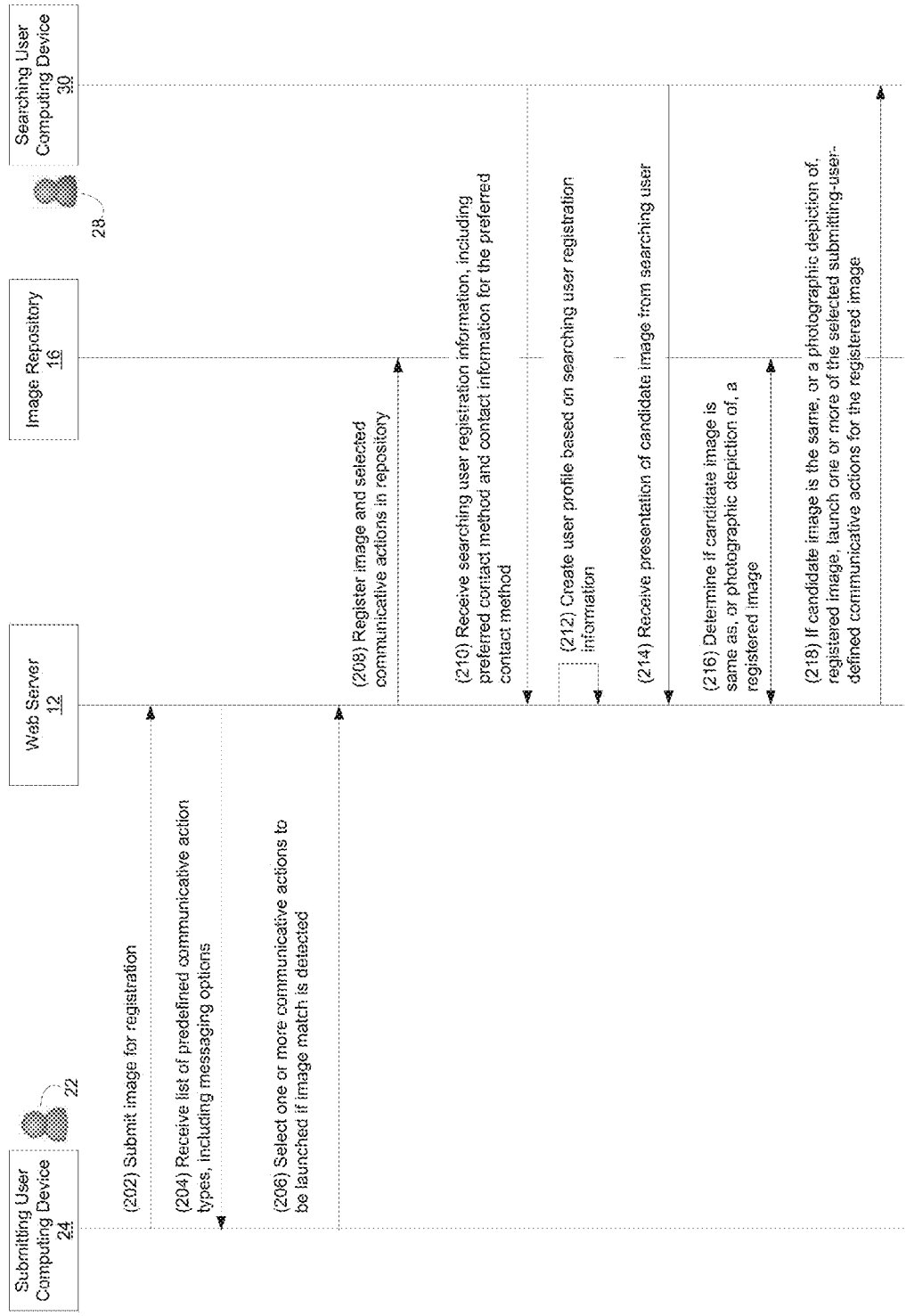
FIG. 3 is a signaling diagram of one embodiment of the method of FIG. 2.

FIG. 3 is a signaling diagram illustrating an example implementation of the method 100 of FIG. 2. A submitting user 22, through his or her respective computing device 24, submits an image for registration to the web server 12 (202). In some embodiments, prior to allowing the submitting user 22 to upload the image, the submitting user 22 has to affirmatively indicate that they have rights in the image (e.g., via a checkbox selection in a website of the web server 12). In some embodiments, the image is submitted from the submitting user computing device 24. In other embodiments, the submitting user 22 provides a hyperlink to an image (e.g., one that resides somewhere on a web server on the Internet) and the web server 12 retrieves that image from the hyperlink for registration.

Based on the image submission, the submitting user 22 receives a list of predefined communicative actions, which includes messaging options (204). The submitting user 22 then submits a selection of one or more communicative actions to be executed if an image match is detected (206). The web server 12 registers the image and selected communicative actions in the image repository 16 (208). The web server 12 may also transmit a notification to the submitting user computing device 24 to notify the submitting user 22 about whether or not the submitted image was successfully registered (not shown).

A searching user 28, through his or her searching user computing device 30, registers with the web server 12 (210). This may include providing user registration information, including a preferred contact method (e.g., email, SMS, phone call, postal mail) and contact information (e.g., name, mailing address, email address, phone number, etc.). In some embodiments, some or all of this information may be provided by using an external authentication method, such as letting the searching user 28 login to the web server 12 by using their social media credentials for a social media platform (e.g., a "Login With Facebook" button). By using such an external authentication, user information can be retrieved from the social media platform, and some additional information may also be obtained (e.g., about the user's interests, social media contacts, etc.). The web server 12 creates a user profile for the searching user 28 based on the user registration information (212). Although not shown in FIG. 2, the creation of a profile for the submitting user 22 may be performed using any combination of the techniques described above for creation of a searching user profile.

The searching user 28 submits a candidate image to the web server 12 using his or her computing device 30 (214). The web server determines if the candidate image is the same as, or is a photographic depiction of, a registered image (216). If the candidate image is the same, or a photographic depiction of, the registered image, the web server 12 launches one or more of the selected submitting-user-defined communicative actions for the registered image (218).

This submission of the candidate image (214) could correspond to the searching user 28 submitting a photographic depiction of an image he or she is viewing as the candidate image. Such a candidate image could be obtained by the searching user 28 recording a photographic copy of an image he or she is viewing (e.g., using a smartphone).

In another example, the submission of 214 could correspond to the searching user 28 submitting a copy of an image he or she is viewing as the candidate image (i.e., instead of submitting a photographic depiction of the image). This could be achieved in a number of ways. One way is for the searching user 28 to save a copy of the image he or she is viewing on their computing device, and then to submit that copy to the web server 12. Another way is for the searching user to obtain a hyperlink to the image he or she is viewing, and then submit that hyperlink to the web server 12. To achieve the submission of the image or hyperlink, in one or more embodiments the searching user 28 may use a web browser plugin that facilitates the transmission of the image or hyperlink from a webpage where the image is being viewed on the searching user computing device 30 to the web server 12. In one example, the web browser plugin presents a toolbar button that, when clicked, enables the searching user 28 to select an image for transmission to the web server 12, and then sends either the image itself or a hyperlink to the image. Thus, the system 10 uses the registered and candidate images to facilitate communication between submitting users 22 and searching users 28, whether those images are being viewed online (e.g., images viewed through a web browser) or offline (e.g., images displayed in a dwelling, store, or office building).

Although FIG. 3 shows the searching user 28 as registering with the web server 12 through their searching user computing device 30, it is understood that in some embodiments, the searching user 28 could register with the web server 12 using a first computing device (e.g., a laptop computer), and could subsequently present images to the web server 12 using a different second computing device (e.g., a smartphone or tablet).

In some embodiments, the same user could access the server as either one of a submitting user 22 or searching user 28. The user could, for example, upload images for registration in the image repository 16 (for which the user would be considered a submitting user 22), and could also upload images to be compared to the image repository for determining matches (for which the user would be considered a searching user 28).

In some embodiments, the same instructions can be applied for groups of images. This could be useful for an organization, such as a car dealership, that has many cars for sale and wants to apply a same discount to all of those cars for a sales promotion. The car dealership could select one set of submitting-user-defined communicative actions, and could apply those actions to a plurality of images. This could be done at the time of upload, or afterwards, for example. In one embodiment, the web server 12 provides a world wide web (WWW) based interface where a submitting user can apply his or her instructions to multiple ones of his or her images. Checkboxes could be used to link items to instructions, for example.

In some embodiments, temporary submitting-user-defined communicative actions could be imposed. For example, an artist may have a portfolio of images for sale, with items in the portfolio being sold at various prices. The artist may wish to have a temporary one-day sale in which a coupon code is appended to messages transmitted for their images, and to cease transmitting that coupon code once the sale has ended. The web server 12 could include a feature in its web-based interface that enables application of such temporary submitting-user-defined communicative action adjustments so that notifications sent to searching users are temporarily adjusted.

In some embodiments, the web server 12 (or an associated web server) may catalog images before they are registered. This could be performed using a website crawler, for example, that pre-populates the image repository 16, or another image repository, with images that are cataloged but unregistered. Then, if a submitting user attempted to register the cataloged image, the web site 12 could offer an opportunity to "claim" the cataloged image, and the image would become associated with the submitting user in question.

Similarly, the web site 12 may similarly offer an opportunity to "claim" a cataloged image if it was submitted by a searching user 28. This may be useful if the searching user 28 wishes to submit an image not in a registration context, but rather to simply determine if it was registered (e.g., a photographer submitting his or her images to the web server 12 to see if the image is registered).

Hardware

Figure 4:
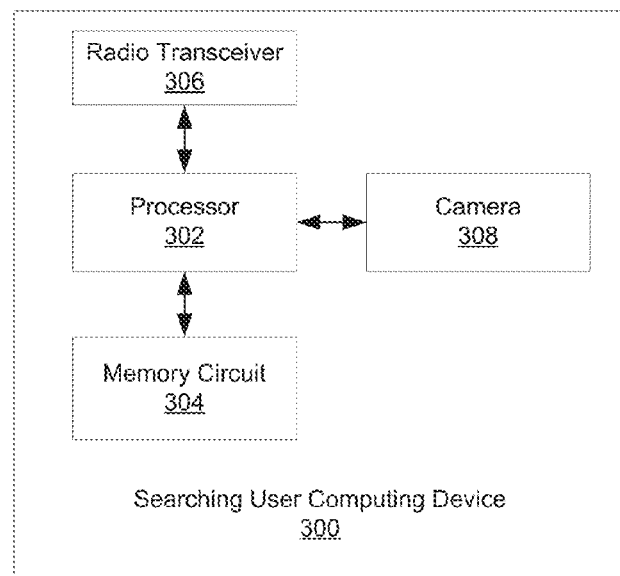
FIG. 4 is a functional block diagram of a representative searching user computing device.

FIG. 4 illustrates an example searching user computing device 300 that can be used as the searching user computing device 30 of FIG. 1. In one or more embodiments, the searching user computing device 300 is a smartphone, tablet, or laptop computing device. Of course, these are only non-limiting examples. The device 300 includes a processing circuit (shown as "processor" 302) that is operatively connected to a memory circuit 304, a radio transceiver 306, and a camera 308. The processor 302 comprises one or more processing circuits, including, for example, one or more microprocessors, microcontrollers, application-specific integrated circuits (ASICs) or the like, configured with appropriate software and/or firmware to carry out one or more of the techniques discussed above (e.g., items 210 and 214). This may include a dedicated application that is executable by the processor 302 to interact with the web server 12 (e.g., in which candidate images can be recorded and submitted, and in which a history of image matches can be reviewed).

The memory circuit 304 stores program instruction and data used by the processor 302 to perform its functions. The memory circuit 404 may comprise one or several types of memory such as read-only memory (ROM), random-access memory, cache memory, flash memory devices, optical storage devices, etc. The radio transceiver 306 is configured to communicate wirelessly with the web server 12 using a predefined wireless communication protocol (e.g., Bluetooth, GSM, LTE, CDMA, etc.). The camera 308 includes a lens and imaging sensor for recording images for submission to the web server 12.

The architecture shown in FIG. 3, or a similar architecture (e.g., one that omits camera 308), may be used for the submitting user computing device 24 in some embodiments.

Figure 5:
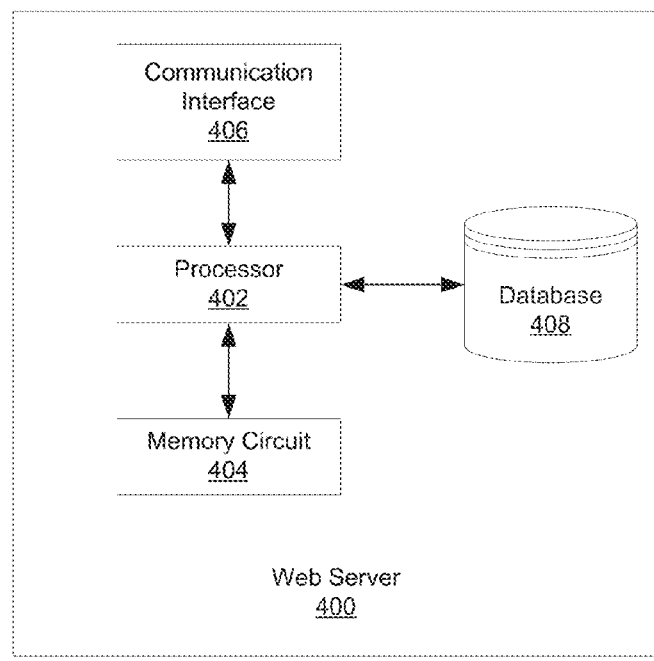
FIG. 5 a functional block diagram of a representative web server.

FIG. 5 illustrates an example web server 400 that can be used as the web server 12 of FIG. 1. The web server 400 includes a processing circuit (shown as "processor" 402) that is operatively connected to a memory circuit 404, a communication interface 406, and a database 408. The processor 402 comprises one or more processing circuits, including, for example, one or more microprocessors, microcontrollers, application-specific integrated circuits (ASICs) or the like, configured with appropriate software and/or firmware to carry out one or more of the techniques discussed above (e.g., the method 100).

The memory circuit 404 stores program instruction and data used by the processor 402 to perform its functions. The memory circuit 404 may comprise one or several types of memory such as read-only memory (ROM), random-access memory, cache memory, flash memory devices, optical storage devices, etc. The communication interface is configured to communicate with submitting user computing devices 24 and searching user computing devices 30. In one or more embodiments, the communication interface is configured according to one or more 802.11 standards for Transmission Control Protocol/Internet Protocol (i.e., TCP/IP) communications.

The database 408 may be used to store some or all of the image repository and/or profile repository 17. Although a single database 408 is shown, it is understood that a plurality of databases could be used. The database 408 may include a relational database, as well as file server capabilities (e.g., folders full of image files and possibly other media files to be transmitted if image matches are found). Although shown as part of the web server 400, it is understood that the database 408 may reside externally to the web server 400.

The one or more processing circuits of the web server 400 are configured to implement the method 100 of FIG. 2. Thus, the one or more processing circuits are configured to:

receive a first image submitted by a first user;
receive one or more communicative actions from the first user to be executed if the image, or a photographic depiction of the image, is submitted by a different second user;
register the image and the communicative actions defined by the first user in the image repository;
receive a second image presented by a second user;
determine whether the second image is substantially the same as the first image, or is a photographic depiction of the first image;
if the second image is not substantially the same as the first image, and is not a photographic depiction of the first image, transmit a notification to the second user that the second image does not match any image in the image repository; and
if the second image is the same as the first image, or is a photographic depiction of the first image, launching the communicative actions defined by the first user and registered for the first image.

The present invention may, of course, be carried out in other ways than those specifically set forth herein without departing from essential characteristics of the present invention. For example, it should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. As an example, items 204 and 206 could occur prior to item 202 in some embodiments, such that an image and its instructions are selected before the image itself is actually uploaded to the web server 12.

Thus, the present embodiments are to be considered in all respects as illustrative and not restrictive, and all changes coming within the meaning and equivalency range of the appended claims are intended to be embraced therein.

What is claimed is:

1. A method of launching communicative actions based on image matching, comprising:
   receiving a first image submitted by a first user;
   receiving one or more communicative actions from the first user to be launched if the image, or a photographic depiction of the image, is submitted by a second user;
   registering the image and the communicative actions defined by the first user in the image repository;
   receiving a second image presented by a second user;
   determining whether the second image is substantially the same as the first image, or is a photographic depiction of the first image;
   if the second image is not substantially the same as the first image, and is not a photographic depiction of the first image, transmitting a notification to the second user that the second image does not match any image in the image repository; and
   if the second image is substantially the same as the first image, or is a photographic depiction of the first image, launching the communicative actions defined by the first user and registered for the first image.

2. The method of claim 1 further comprising creating and storing a profile associated with the second user, the profile containing information about communicating with the second user.

3. The method of claim 1 wherein launching the communicative actions defined by the first user comprises sending to the second user by email a predetermined message provided by the first user.

4. The method of claim 1 wherein launching the communicative actions defined by the first user comprises sending to the second user by Short Message System a predetermined message provided by the first user.

5. The method of claim 1 wherein launching the communicative actions defined by the first user comprises sending to the second user a predetermined hypertext link provided by the first user.

6. The method of claim 1 wherein launching the communicative actions defined by the first user comprises sending to the second user a predetermined media file specified by the first user.

7. The method of claim 1 wherein launching the communicative actions defined by the first user comprises sending to the second user a predetermined message via postal mail or courier.

8. The method of claim 1 wherein launching the communicative actions defined by the first user comprises invoking an Application Programming Interface (API) to software specified by the first user.

9. The method of claim 1 further comprising
obtaining information about a relationship between the second user and the first user; and
if the second image is substantially the same as the first image, or is a photographic depiction of the first image, launching the communicative actions defined by the first user and registered for the first image only if the relationship between the second user and the first user meets predetermined criteria.

10. The method of claim 1 further comprising
if the second image is substantially the same as the first image, or is a photographic depiction of the first image, sending a notification to the first user that a presented image matched the submitted image.

11. The method of claim 10 further comprising, if the presented image matches the submitted image, sending to the first user information about the second user.

12. A web server, comprising:
a communication interface;
at least one database; and
a processor operatively connected to the communication interface and the database, the processor operative to:
receive a first image submitted by a first user;
receive one or more communicative actions from the first user to be executed if the image, or a photographic depiction of the image, is submitted by a different second user;
register the image and the communicative actions defined by the first user in the image repository;
receive a second image presented by a second user;
determine whether the second image is substantially the same as the first image, or is a photographic depiction of the first image;
if the second image is not substantially the same as the first image, and is not a photographic depiction of the first image, transmit a notification to the second user that the second image does not match any image in the image repository; and
if the second image is the same as the first image, or is a photographic depiction of the first image, launching the communicative actions defined by the first user and registered for the first image.

13. The method of claim 12 wherein the processor is further operative to create and store a profile associated with the second user, the profile containing information about communicating with the second user.

14. The method of claim 12 wherein the processor is operative to launch the communicative actions defined by the first user by sending to the second user by email a predetermined message provided by the first user.

15. The method of claim 12 the processor is operative to launch the communicative actions defined by the first user by sending to the second user by Short Message System a predetermined message provided by the first user.

16. The method of claim 12 wherein the processor is operative to launch the communicative actions defined by the first user by sending to the second user a predetermined hypertext link provided by the first user.

17. The method of claim 12 wherein the processor is operative to launch the communicative actions defined by the first user by sending to the second user a predetermined media file specified by the first user.

18. The method of claim 12 wherein the processor is operative to launch the communicative actions defined by the first user by sending to the second user a predetermined message via postal mail or courier.

19. The method of claim 12 wherein the processor is operative to launch the communicative actions defined by the first user by invoking an Application Programming Interface (API) to software specified by the first user.

20. The web server of claim 12 wherein the processor is further operative to:
obtain information about a relationship between the second user and the first user; and
if the second image is substantially the same as the first image, or is a photographic depiction of the first image, launch the communicative actions defined by the first user and registered for the first image only if the relationship between the second user and the first user meets predetermined criteria.

21. The web server of claim 12 wherein the processor is further operative to:
if the second image is substantially the same as the first image, or is a photographic depiction of the first image, send a notification to the first user that a presented image matched the submitted image.

22. The method of claim 21 wherein the processor is further operative to, if the presented image matches the submitted image, send to the first user information about the second user.

* * * * *